US009323678B2

(12) United States Patent
Kumar et al.

(10) Patent No.: US 9,323,678 B2
(45) Date of Patent: Apr. 26, 2016

(54) IDENTIFYING AND PRIORITIZING CRITICAL INSTRUCTIONS WITHIN PROCESSOR CIRCUITRY

(75) Inventors: Amit Kumar, Santa Clara, CA (US); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 241 days.

(21) Appl. No.: 13/993,376

(22) PCT Filed: Dec. 30, 2011

(86) PCT No.: PCT/US2011/068007
§ 371 (c)(1),
(2), (4) Date: Jun. 12, 2013

(87) PCT Pub. No.: WO2013/101138
PCT Pub. Date: Apr. 7, 2013

(65) Prior Publication Data
US 2013/0339595 A1    Dec. 19, 2013

(51) Int. Cl.
*G06F 12/08*    (2006.01)
*G06F 13/14*    (2006.01)
*G06F 9/38*     (2006.01)

(52) U.S. Cl.
CPC ............ *G06F 12/084* (2013.01); *G06F 9/3824* (2013.01); *G06F 9/3838* (2013.01); *G06F 9/3857* (2013.01); *G06F 13/14* (2013.01)

(58) Field of Classification Search
CPC ... G06F 12/084; G06F 12/08; G06F 12/0806; G06F 12/0802; G06F 9/06; G06F 9/30; G06F 9/38; G06F 9/3824; G06F 15/80; G06F 9/46
See application file for complete search history.

(56) References Cited

U.S. PATENT DOCUMENTS

| 5,493,667 A * | 2/1996 | Huck .................... G06F 12/126 711/125 |
| 6,434,673 B1 * | 8/2002 | Palanca et al. ................ 711/133 |
| 6,760,816 B1 * | 7/2004 | Ju ....................... G06F 9/30043 711/133 |
| 6,782,469 B1 * | 8/2004 | Wilkerson ............ G06F 9/3824 712/216 |
| 7,395,416 B1 | 7/2008 | Sathaye |
| 7,822,951 B2 * | 10/2010 | Ramani et al. ................ 712/218 |

(Continued)

FOREIGN PATENT DOCUMENTS

| TW | 200632740 | 9/2006 |
| TW | 200935303 | 8/2009 |

OTHER PUBLICATIONS

Taiwan Patent Office, Office Action mailed Dec. 22, 2014, in Taiwanese Application No. 101149547. (Redacted).

(Continued)

*Primary Examiner* — Jared Rutz
*Assistant Examiner* — Jean Edouard
(74) *Attorney, Agent, or Firm* — Trop, Pruner & Hu, P.C.

(57) ABSTRACT

In one embodiment, the present invention includes a method for identifying a memory request corresponding to a load instruction as a critical transaction if an instruction pointer of the load instruction is present in a critical instruction table associated with a processor core, sending the memory request to a system agent of the processor with a critical indicator to identify the memory request as a critical transaction, and prioritizing the memory request ahead of other pending transactions responsive to the critical indicator. Other embodiments are described and claimed.

21 Claims, 5 Drawing Sheets

(56) References Cited

U.S. PATENT DOCUMENTS

| | | | | |
|---|---|---|---|---|
| 8,495,307 B2* | 7/2013 | Chen | G06F 12/0811 | 711/137 |
| 2002/0087800 A1* | 7/2002 | Abdallah | G06F 9/383 | 711/137 |
| 2003/0056072 A1* | 3/2003 | Schmisseur | G06F 12/0802 | 711/170 |
| 2003/0056075 A1* | 3/2003 | Schmisseur | G06F 12/0802 | 711/173 |
| 2005/0268073 A1* | 12/2005 | Karp | G06F 9/3842 | 712/207 |
| 2006/0053351 A1* | 3/2006 | Anderson | G06F 9/3004 | 714/100 |
| 2006/0064695 A1* | 3/2006 | Burns | G06F 9/3851 | 718/100 |
| 2006/0161738 A1* | 7/2006 | Saha et al. | | 711/150 |
| 2007/0005909 A1* | 1/2007 | Cai | G06F 12/0811 | 711/146 |
| 2007/0101067 A1* | 5/2007 | Shafi | G06F 12/0817 | 711/141 |
| 2007/0150703 A1* | 6/2007 | Mendelson et al. | | 712/200 |
| 2007/0260942 A1* | 11/2007 | Rajwar | G06F 9/526 | 714/54 |
| 2008/0059723 A1* | 3/2008 | Math et al. | | 711/154 |
| 2009/0150890 A1 | 6/2009 | Yourst | | |
| 2009/0222625 A1* | 9/2009 | Ghosh | G06F 9/383 | 711/130 |
| 2009/0248976 A1* | 10/2009 | Rotithor | | 711/113 |
| 2010/0229172 A1 | 9/2010 | Burns et al. | | |

OTHER PUBLICATIONS

Samantika Subramaniam, et al., "Criticality-Based Optimizations for Efficient Load Processing," Feb. 2009, pp. 1-12.

International Searching Authority, "Notification of Transmittal of the International Search Report and the Written Opinion of the International Searching Authority," mailed Sep. 25, 2012, in International application No. PCT/US2011/068007.

* cited by examiner

IDENTIFYING AND PRIORITIZING CRITICAL INSTRUCTIONS WITHIN PROCESSOR CIRCUITRY

BACKGROUND

In designing modern processors, a converged core design enables a single core architecture (and microarchitecture) to be used across multiple product lines. For example a single core design can be used across several client and server product families, which differ in the number of cores being deployed, the maximum power consumed and the memory bandwidth and/or speed required.

Such a development model typically requires different non-core circuitry, often referred to as an uncore, that targets the different segments to customize the interconnect, cache and memory subsystem to fulfill segment-specific requirements. A simplified interface and protocol is provided across the core-uncore boundary, which allows low effort integration of core and uncore for each segment. This simplified interface means that the converged core and the various uncores are developed and optimized independently. As such, the interface has little to no ability to convey information across the boundary that can be exploited to deliver higher performance and/or lower power.

DETAILED DESCRIPTION

In various embodiments, a core-uncore interface of a processor can be modified in order to provide for an ability to identify certain transactions as having a higher priority. In this way, the uncore can selectively provide higher priority to a small number of transactions that it receives. As an example, these transactions can be memory requests corresponding to load instructions that have a high impact on overall performance. In one embodiment, these transactions can be located at critical instruction pointers (IPs). Such critical loads that regularly also miss one or more core caches can be identified as high priority transactions using a priority indicator, e.g., a bit of a transaction communicated via a processor's intra-die interface (IDI) bus connecting the core to an uncore. Note that the notion of a critical load can be related to the notion of a critical path in a program. Critical loads frequently are part of the critical path and have an outsized impact (if slowed or speeded) on the overall program.

To effect performance improvements using this information, the uncore can, at a number of decision making points, act upon this priority indicator or hint to provide higher priority to such transactions. Although the scope of the present invention is not limited in this regard, these locations can include a ring interconnect, a cache controller, and a memory controller, all of which can be implemented in a processor uncore. In this way, the latency in obtaining data corresponding to a high priority load instruction can be reduced, speeding up the end-to-end application.

Figure 1:
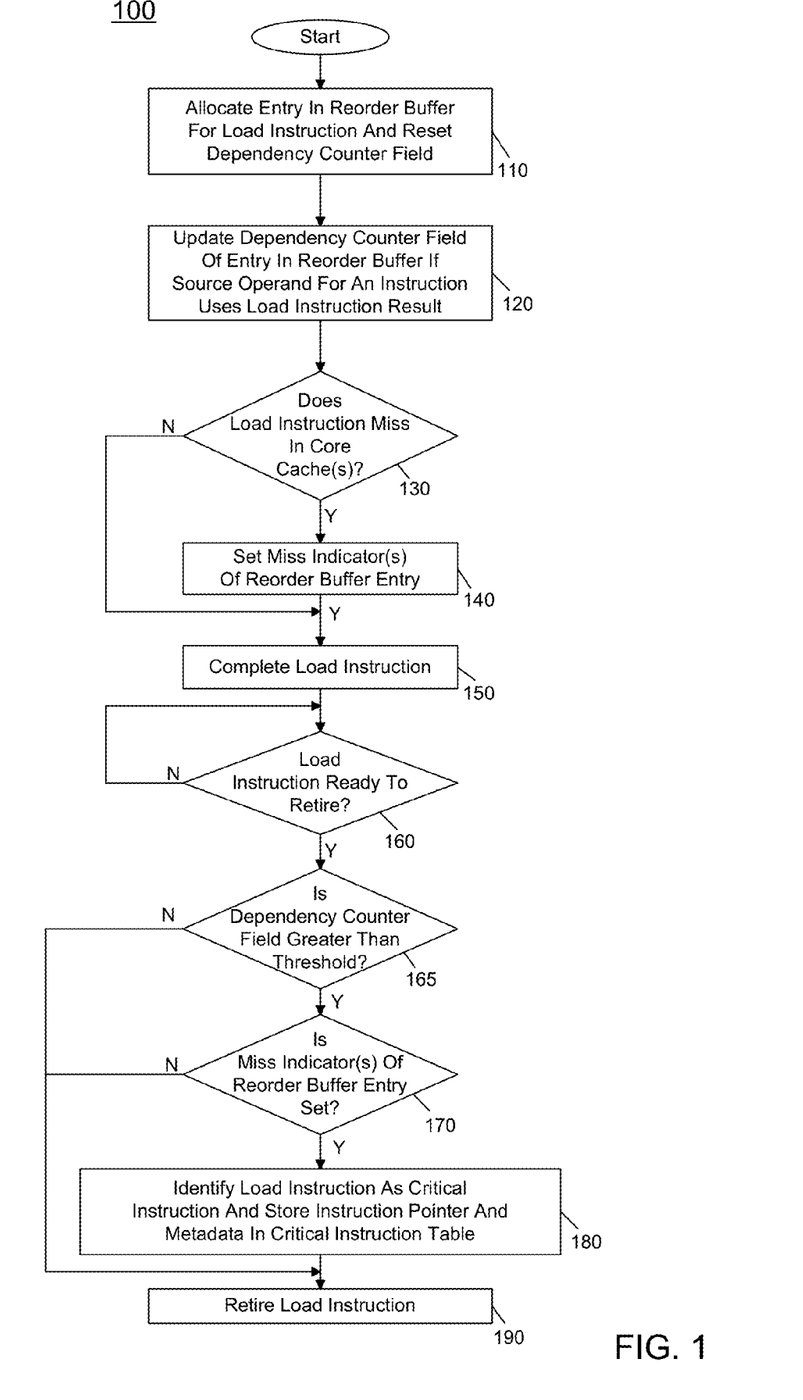
FIG. 1 is a flow diagram of a method in accordance with an embodiment of the present invention.

Referring now to FIG. 1, shown is a flow diagram of a method in accordance with an embodiment of the present invention. As shown in FIG. 1, method 100 can be implemented in critical instruction logic of a processor, which can be incorporated in part by retirement logic circuitry, e.g., associated with a reorder buffer (ROB). As seen, method 100 can begin by allocating an entry in a ROB for a load instruction and resetting a dependency counter field of this entry (block 110). In one embodiment, the dependency counter field can be reset to zero at an allocate stage of the core pipeline when a load operation is allocated an entry in the ROB. Note that this dependency counter field can be incremented during occupancy of the load instruction in the entry whenever a dependent instruction identifies as a source operand the result of this load instruction (namely the data obtained in response to this load instruction). Thus at a rename stage, a check is made on whether the source(s) of an operation OPx are being produced in the machine, and if so the dependency counter field of a ROB entry of a producer instruction OPx is incremented. In some embodiments, a single level of dependency can be used to cause incrementing of this counter field, while in other embodiments instructions of multiple dependency levels can cause incrementing of the counter field. Thus during execution in the processor control passes to block 120 where this dependency counter field can be updated if a source operand for an instruction uses the load instruction's result data.

During execution of the load instruction itself, it can be determined whether the load instruction misses in one or more levels of core caches (diamond 130). For example, a processor core can be configured with multiple internal cache levels, including a so-called level 1 (L1) cache and a level 2 (L2) cache, which are private caches of the core of a multi-level cache hierarchy. If a miss occurs in a given core cache as the load instruction traverses a core cache pipeline (e.g., an L1 pipeline) a corresponding miss indicator of the ROB entry can be set at block 140.

Control next passes to block 150 where the load instruction can be completed, e.g., by obtaining the requested value from a cache of the core, a shared cache such as a last level cache (LLC) of an uncore coupled to the cache or from further locations in a memory hierarchy, such as a system memory coupled to the processor. The entry for the load instruction in the ROB may be updated on completion of this instruction to indicate that the load instruction is ready to retire, so that a positive indication can be made at diamond 160, e.g., when the load instruction reaches a top of the ROB.

Various operations can be performed during retirement of the instruction, such as determining whether any exception, fault or other special processing occurred as a result of this instruction. At retirement of the load instruction, it can be determined at diamond 165 whether the dependency counter field is greater than a threshold. Thus at retirement if an operation being retired is a load, the dependency counter field of its corresponding ROB entry can be accessed and compared to a threshold. If the count is above the threshold, that load instruction and its corresponding IP is deemed as critical. This threshold can correspond to a number of instructions dependent on this load instruction greater than which the load instruction can be considered critical, in that control of latency of the instruction execution can affect overall program operation. If it is determined that the value of the dependency counter field is greater than this threshold, control passes to diamond 170 where it can be determined whether one or more miss indicators of the ROB entry are set, indicative of a core cache miss.

If so, control passes to block 180 where the load instruction can be identified as a critical instruction. Accordingly, an instruction pointer for this load instruction along with various metadata (as will be discussed below) associated with this instruction can be stored in a critical instruction table. In various embodiments, the critical instruction table can be stored in a buffer of the processor, such as in the L2 cache, so that it can be accessed during execution of load instructions to determine whether a given instruction is considered to be a critical instruction. Thus where a critical load instruction is also experiencing a lot of misses by being executed multiple times and missing multiple times in the core's internal caches (based on the miss indicator), its IP address can be inserted into the critical instruction table. In one embodiment, this table can be dynamically created and managed, and used to reflect the most critical points in the current phase of the program whose latency have an outsized impact on the performance and need to be improved.

Then control passes to block 190 where the instruction can be retired and accordingly, the entry of the ROB associated with this instruction can be deallocated. As seen, from both of diamonds 165 and 170 if the determination is in the negative, control passes directly to block 190. Although shown with this particular implementation in the embodiment of FIG. 1, understand the scope of the present invention is not limited in this regard. For example, in some embodiments, "recursive" or indirect dependents to any operation can be tracked using the dependency counter field to improve the accuracy of the selection of critical loads.

In some embodiments, additional (auxiliary) statistics can be used to gain further insights as to making a critical instruction determination. Namely, a table to track the most recent unique load IPs encountered in the program (per thread) can be maintained. This table can include entries for each such unique load instruction. Each entry can include, in addition to the load IP, a dependency counter field to store a count of the number of dependent instructions (e.g., up to 2 levels) for the load IP the last time the instruction retired, and an average of this dependent instruction count across a configurable history window, and the number of times the load IP was encountered (and retired). Note that in some embodiments, the critical instruction table may also store in each entry the number of times each critical IP was encountered (and retired) and the last/average number of dependents.

Using this information, a running counter of the ratio of the critical load IPs to the total number of unique load IPs can be tracked. This ratio thus measures the fraction of load IPs that were marked as critical. In various implementations this fraction can be kept relatively small (e.g., less than approximately 5%) so that the prioritization is only infrequently applied in situations with the highest benefit for the application with least impact to the typical non-critical load instruction.

Note that by placing load instructions into the critical instruction table only when they have been characterized as both critical (e.g., based on number of dependencies) and delinquent (e.g., based on misses in one or more core caches), optimizations and acceleration of the processing of these instructions can be realized. In other words, an instruction can be identified as critical based on a criticality level and a delinquency level associated with the instruction.

Figure 2:
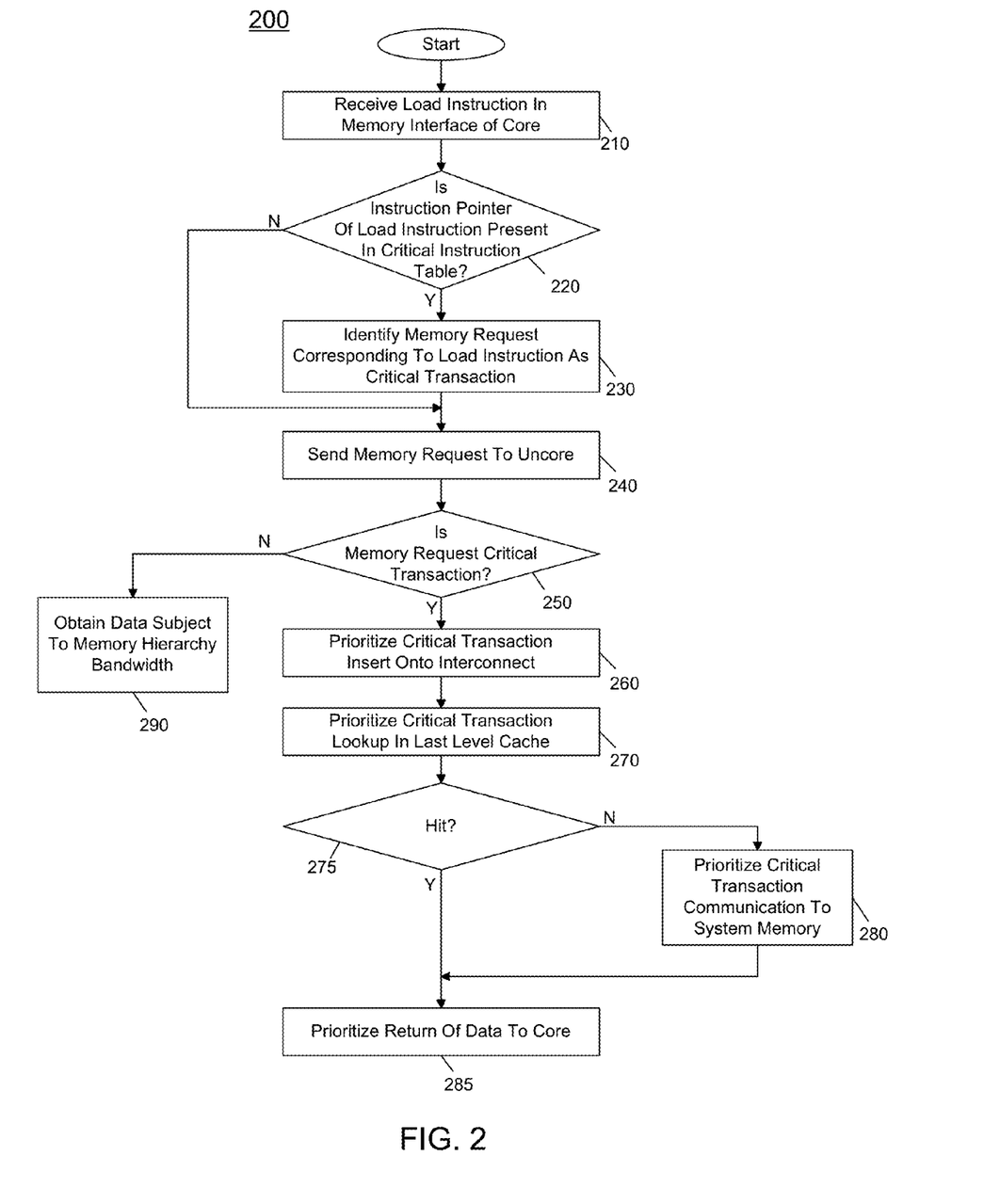
FIG. 2 is a flow diagram of a method for handling a critical load instruction in accordance with an embodiment of the present invention.

Referring now to FIG. 2, shown is a flow diagram of a method for handling a critical load instruction in accordance with an embodiment of the present invention. As shown in FIG. 2, method 200 may begin by receiving a load instruction in a memory interface of a core (block 210). For example, receipt of the instruction in this memory interface can be responsive to a miss of this instruction in the core cache(s). Accordingly, a memory request corresponding to this load instruction is to be sent out to further portions of the memory hierarchy, namely a LLC associated with the uncore and further portions of the memory hierarchy if needed.

As seen in FIG. 2, control passes to diamond 220 where it can be determined, e.g., by the L2 cache, whether the instruction pointer of the load instruction is present in the critical instruction table. If so, control passes to block 230 where the memory request corresponding to this load instruction can be identified as a critical instruction. Although the scope of the present invention is not limited in this regard, in one embodiment this identification can be by way setting of a critical indicator in a memory request transaction, which may be a single bit of the transaction to identify it as a critical transaction. Thus when a load instruction misses the L1 cache (and the L2 cache) and is allocated a fill buffer prior to being sent to the uncore, a check can be made to determine whether the load instruction's IP is present in the critical instruction table. If so, the control indicator can be sent in the memory transaction request being sent to the uncore to mark the load as critical.

Still referring to FIG. 2, for either a critical or non-critical load instruction, a memory request transaction can be sent to the uncore (block 240). For example, the fill buffer is allocated to this memory request transaction and the transaction is sent along an interface between the core and the uncore, with the critical indicator set when the load instruction has a corresponding entry in the critical instruction table (and reset for a non-critical instruction).

Various operations in an uncore can be prioritized for critical instructions. In an embodiment having a ring interconnect structure, paths through the incoming and outgoing queues of the ring interconnect can be optimized for prioritized instructions. As one example, a higher priority can be given to such transactions during an arbitration performed at the head of an incoming queue to the ring, as well as to other queues in the interconnect router that handle messages related to multi-core coherence. Higher priority can thus be given to messages for processing of critical loads, e.g., by granting access to the ring for such transactions ahead of other transactions. Similar arbitration control can be provided at the head of outgoing queues into a ring stop that arbitrate between messages or data originating from co-located LLC bank controllers and a core that both share the interconnect stop or port. For example, data returns from the LLC bank for critical load LLC hits can be granted priority access to the outgoing queue ahead of a new non-critical load request from the co-located core to enable reduced latency for return to the core of the critical load.

In one embodiment, a cache controller can give higher priority to critical loads in the LLC lookup pipeline to determine hit or miss in the LLC data array. In addition, when allocating request transaction identifiers (RTIDs), which are credits used to send out memory transactions (for LLC misses), reservations or higher priority can be given to critical instructions over other LLC misses.

In one embodiment, a memory controller of the uncore can give higher priority in its command picking scheduler for column address strobes (CAS) commands for critical loads that miss the LLC but hit an open page in system memory. In addition, row address strobe (RAS) commands such as recharge and activate for closed memory pages mapping to data of these critical instructions can be requested as early as possible.

The following operations now of FIG. 2 are with reference to operations in the uncore to perform the memory transaction to obtain data responsive to a load instruction. First at diamond 250 it can be determined whether the memory request transaction is a critical transaction. As discussed above, this determination can be based on a set critical indicator that accompanies the transaction packet. If so, control passes to block 260 where the critical transaction can be prioritized for insertion onto an interconnect. In one embodiment, a multi-core processor can include a ring interconnect having an outgoing port with a buffer to store pending new transactions for insertion onto the multi-core interconnect. The prioritization can be effected, in one embodiment by indicating the priority of this critical memory request to thus cause an arbitration to be performed to be determined in favor of this transaction to enable it to gain entry onto the ring interconnect as early as possible.

Accordingly, the transaction can proceed along the ring interconnect to a selected destination, e.g., a bank of a distributed cache controller associated with an LLC bank for the core in question. Thus at block 270, a lookup in this LLC can also be prioritized. As with the above discussion, this prioritization can be effected in one embodiment by causing an arbitration between pending requests to be decided in favor of this critical transaction. Responsive to the lookup, it can be determined at diamond 275 whether a hit has occurred, meaning that the requested data is present in the LLC. If not, control passes to block 280 where because of a miss in the LLC, the memory request transaction can be provided to a further portion of the memory hierarchy, namely a system memory. This transaction can be prioritized for access to the interconnect when going from the LLC to the system memory. At block 280 a memory controller of the uncore can prioritize this memory request transaction out to system memory to thus obtain the requested data ahead of other pending memory requests. From both of diamond 275 when a hit occurs and from block 280, control passes to block 285 where a data return to the core can be prioritized. As above, this prioritization can be realized by performing an arbitration in favor of this data return over other transactions. Such prioritization may be done all along the portion of the interconnect and other data paths that carries the data from memory to the requesting core. As an example, these prioritizations can be both on the interconnect and memory controller.

Accordingly, using these synergistic prioritization techniques at various locations of an uncore, a critical memory request can be more rapidly fulfilled and requested data provided back to the core with a lower latency than would otherwise have occurred in a priority agnostic uncore.

Note that if at diamond 250 it is instead determined that the memory request transaction is not a critical transaction, control passes to block 290 where the data can be obtained subject to the memory hierarchy bandwidth. That is, rather than the various prioritizations discussed above, the memory request can be handled, e.g., based on its time of entry into the uncore according to various arbitration techniques such as round robin or other arbitration technique, and thus the data can be obtained subject to a greater latency. Although shown with this particular implementation in the embodiment of FIG. 2, understand the scope of the present invention is not limited in this regard.

Embodiments thus provide selective priority to transactions communicated from a core to the uncore, as accurate information on execution patterns in the core can be used to identify critical transactions. Uncore circuitry can then leverage this information to reduce latency in handling of these transactions. Although described herein as to the detection, tracking and leveraging of load criticality information for uncore optimizations, understand the scope of the present invention is not limited in this regard, and other embodiments can be used in connection with other critical instructions such as translation lookaside buffer (TLB) related misses, or other prioritizations such as prioritizing requests from one IP block over another in a chip multi-processor system (e.g., prioritizing requests from a processor core over those from a graphics engine in a system with integrated graphics). For example, a transaction corresponding to a latency-sensitive request from a core can be prioritized over another transaction corresponding to a bandwidth-sensitive request from a graphics engine of the processor.

Figure 3:
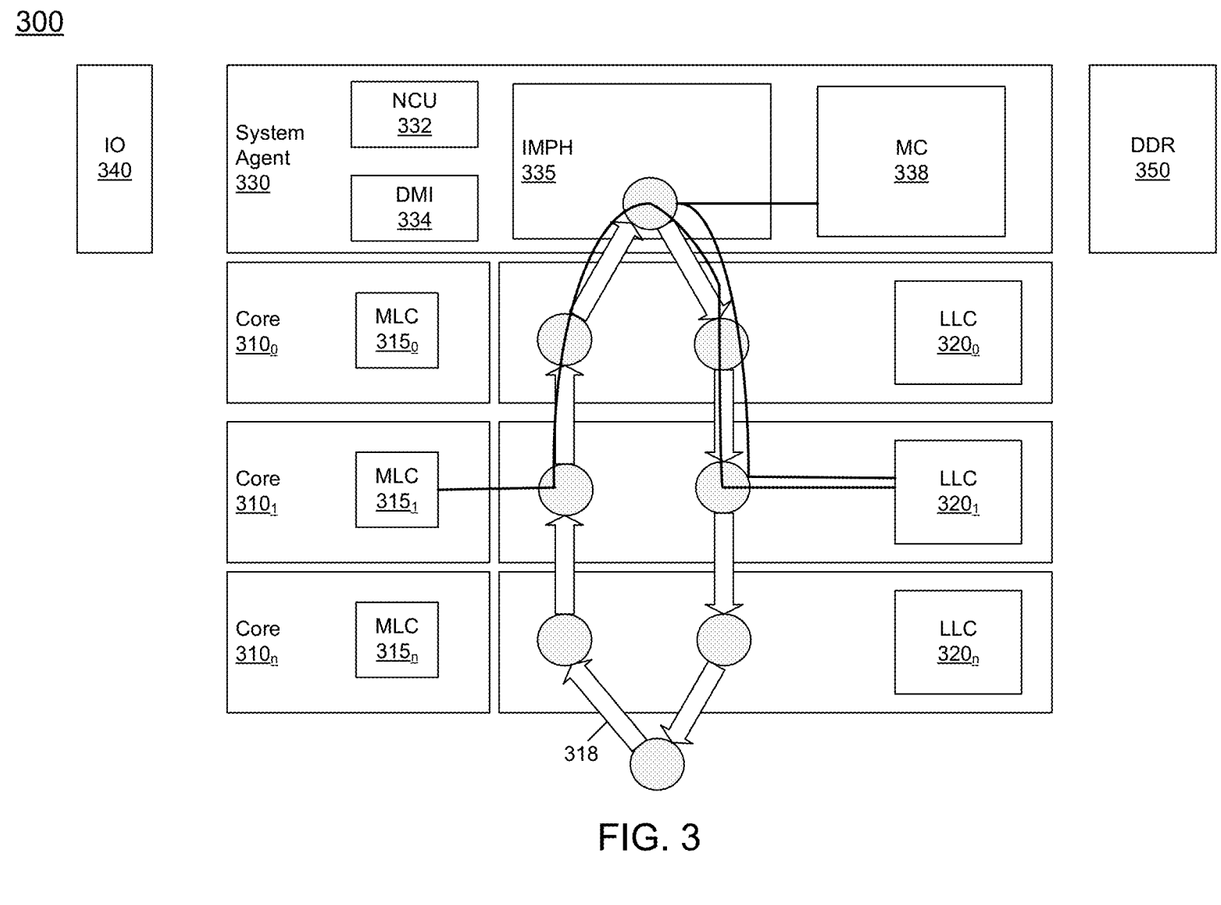
FIG. 3 is a block diagram of a multicore processor in accordance with an embodiment of the present invention.

Embodiments can be implemented in many different types of processors. Referring now to FIG. 3, shown is a block diagram of a multicore processor in accordance with an embodiment of the present invention. As shown in FIG. 3, processor 300 includes a plurality of cores $310_0$-$310_n$. As seen, each core can include a mid-level level cache memory $315_0$-$315_n$.

In turn, an interconnect 318, which in the embodiment shown is a ring interconnect, couples together the various cores and other circuitry of the processor. Specifically, the ring interconnect couples the cores to a distributed cache memory formed of a plurality of LLC memory banks $320_0$-$320_n$. For ease of illustration, understand that each of these cache banks can include a distributed portion of a cache controller. In the embodiment shown, each bank of the LLC can be co-located with one of the cores sharing the same interconnect stop or port.

In addition, processor 300 includes a system agent circuit 330 that can include an integrated memory peripheral hub (IMPH) 335 that can provide an interface, via a memory controller 338 to a system memory 350, which in one embodiment can be a double data rate (DDR) dynamic random access memory (DRAM). As further seen, IMPH 335 can communicate via a network controller unit 332 and a direct memory interface 334 with an input/output (IO) agent 340.

In the context of prioritizing critical instruction handling in this processor, assume that a critical instruction issued in core $310_1$ misses in the corresponding mid-level cache $315_1$. Accordingly, a memory request can be sent with a critical indicator. Via this critical indicator, an arbitration performed at an input or output port to interconnect 318 associated with core $310_1$ can be decided in favor of this memory request. As seen the request traverses along the interconnect to LLC $320_1$, without delay and ahead of other pending transactions (where present), this request's LLC lookup can be performed. Assuming that the data is present in LLC $320_1$, the data can be returned in a prioritized manner to core $310_1$. If instead a miss results, the longer latency to access the data from system memory 350 is incurred. This involves sending the request over the interconnect to IMPH 335, again prioritizing the request all the way. Upon its return through memory controller 338, return of the data to core $310_1$ can be prioritized over other pending transactions and the data can simultaneously go to both the requesting core $310_1$ as well as fill the LLC bank $320_1$. During data return of non-critical loads, IMPH 335 may fill the data to the owning LLC bank first and then subsequently the LLC may forward the data to the requesting core. For critical loads however, IMPH 335 may execute two simultaneous transactions: (a) a first transaction to the requesting core; and (b) a second transaction to the LLC bank. The latency as seen by the core for critical loads will hence be shortened. Although shown at this high level in the embodiment of FIG. 3, understand the scope of the present invention is not limited in this regard.

Figure 4:
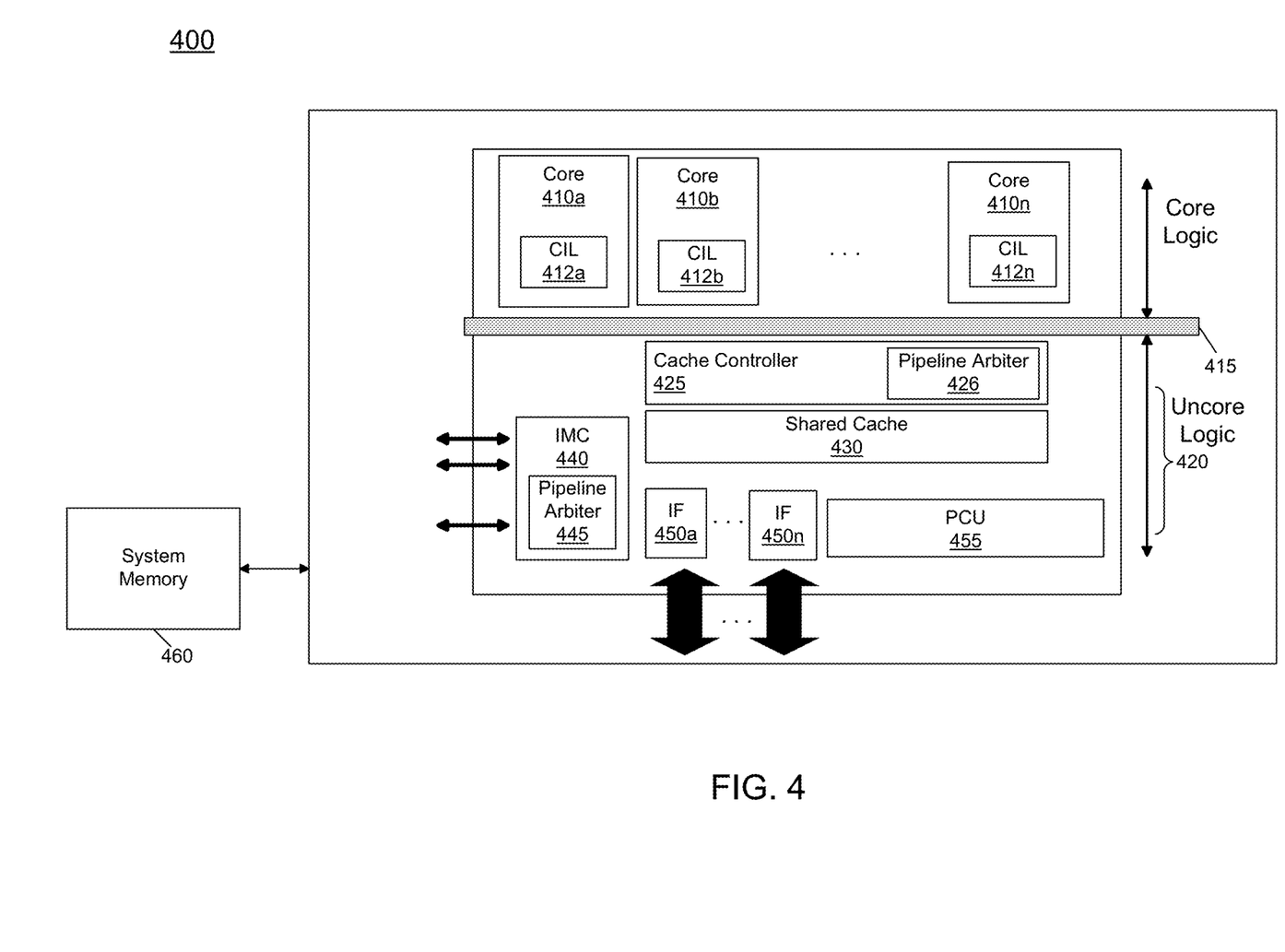
FIG. 4 is a block diagram of a processor in accordance with another embodiment of the present invention.

Referring now to FIG. 4, shown is a block diagram of a processor in accordance with another embodiment of the present invention. As shown in FIG. 4, processor 400 may be a multicore processor including a plurality of cores $410_a$-$410_n$. In one embodiment, each such core may be of an independent power domain and can be configured to operate at an independent voltage and/or frequency, and to enter turbo mode when available headroom exists. Each core can include a critical instruction logic 412 that can identify critical instructions, store them in a critical instruction table, and indicate such instructions as critical instructions when they are sent to uncore circuitry.

As such the various cores may be coupled via an interconnect 415 to a system agent or uncore 420 that includes various components. In various embodiments, access to interconnect 415 can be prioritized for critical transactions from a core. As seen, the uncore 420 may include a shared cache 430 which may be a last level cache. To provide access to this memory, a cache controller 425 also may be present in the uncore. As seen cache controller 425 can include a pipeline arbiter 426 that can arbitrate between multiple requests to select a request to provide to a lookup path of this shared cache memory. In addition, the uncore may include an integrated memory controller 440, various interfaces 450 and a power control unit 455. Integrated memory controller 440 can include a pipeline arbiter 445 that can arbitrate between multiple requests seeking access to a system memory 460.

With further reference to FIG. 4, processor 400 may communicate with system memory 460, e.g., via a memory bus. In addition, by interfaces 450, connection can be made to various off-chip components such as peripheral devices, mass storage and so forth. While shown with this particular implementation in the embodiment of FIG. 4, the scope of the present invention is not limited in this regard.

Figure 5:
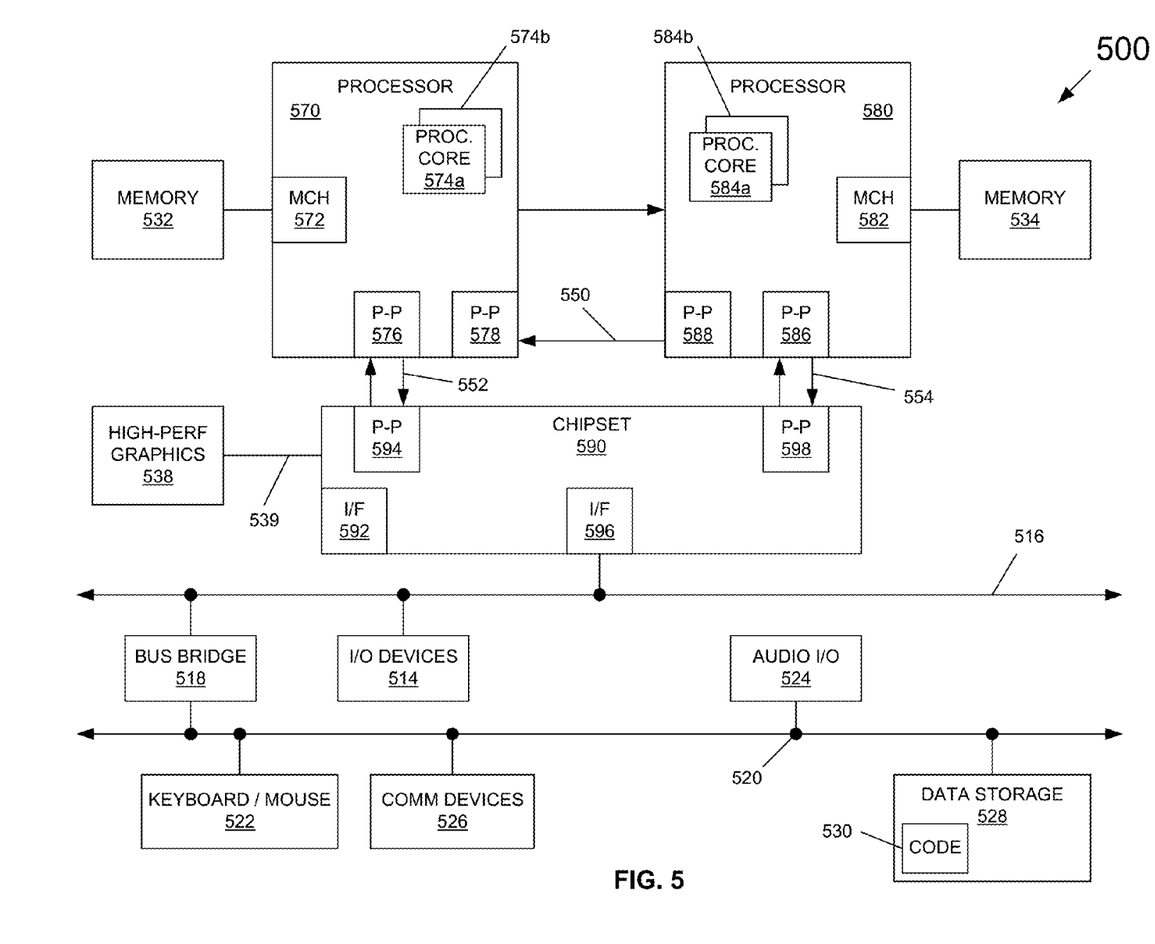
FIG. 5 is a block diagram of a system in accordance with an embodiment of the present invention.

Embodiments may be implemented in many different system types. Referring now to FIG. 5, shown is a block diagram of a system in accordance with an embodiment of the present invention. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574a and 574b and processor cores 584a and 584b), although potentially many more cores may be present in the processors. Each of the processors can include a critical instruction logic or other logic to identify critical instructions and to prioritize their handling in uncore circuitry, as described herein.

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCH's 572 and 582 couple the processors to respective memories, namely a memory 532 and a memory 534, which may be portions of system memory (e.g., DRAM) locally attached to the respective processors. First processor 570 and second processor 580 may be coupled to a chipset 590 via P-P interconnects 552 and 554, respectively. As shown in FIG. 5, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 5, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Embodiments can be incorporated into other types of systems including mobile devices such as a smart cellular telephone, tablet computer, netbook, or so forth.

Embodiments as described herein are applicable in architectures that go beyond the specific configurations covered in FIGS. 3-5. For instance, if there is a fourth-level cache (L4) beyond the third level LLC described in FIG. 3, the methods described to speed up critical loads in the LLC would be applicable and implementable also in the L4 cache. Also in architectures where a multi-level memory hierarchy is implemented, the notion of near-memory and far-memory is prevalent. Here the near-memory and far-memory may be implemented using very different memory technologies that may differentiate themselves on bit-density, power, latency and bandwidth, among other relevant metrics. The optimizations described in the memory controller as depicted in FIG. 3 may be applicable and extensible to even such a multi-level memory hierarchy.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
    a plurality of cores including a first core to execute instructions, the first core including a pipeline having a reorder buffer (ROB) including a plurality of entries each associated with an instruction received in the pipeline, and a first logic to determine whether a load instruction is a critical instruction based at least in part on a miss indicator of an entry of the ROB associated with the load instruction to indicate that the load instruction missed in a core cache and a dependency counter field of the entry of the ROB that is greater than a threshold, and if so to send a memory request transaction associated with the load instruction to a system agent of the processor with a critical indicator to indicate the critical instruction; and
    the system agent coupled to the first core and including a distributed cache controller having a plurality of portions each associated with a corresponding portion of a distributed shared cache memory of the system agent, each of the distributed cache controller portions and the distributed shared cache memory portions associated with one of the plurality of cores, a memory controller to interface with a system memory coupled to the processor and an interconnect to couple the distributed shared cache memory and the distributed cache controller with the first core, wherein the system agent is to prioritize the memory request transaction based on the critical indicator at a plurality of points of the system agent.

2. The processor of claim 1, wherein the system agent comprises a first arbiter associated with the interconnect, the first arbiter to prioritize the memory request transaction including the critical indicator ahead of at least one other transaction present in a buffer to store pending transactions for insertion onto the interconnect.

3. The processor of claim 2, wherein the system agent comprises a second arbiter associated with the distributed cache controller, the second arbiter to prioritize the memory request transaction including the critical indicator ahead of at least one other transaction that seeks access to the distributed shared cache memory.

4. The processor of claim 3, wherein the system agent comprises a third arbiter associated with the memory controller, the third arbiter to prioritize the memory request transaction including the critical indicator ahead of at least one other transaction that seeks access to the system memory.

5. The processor of claim 1, wherein the distributed shared cache memory is to store a table having plurality of entries each to store an instruction pointer for a critical instruction, the first logic to insert an instruction pointer of the load instruction in an entry of the table when the load instruction is identified as a critical instruction.

6. The processor of claim 5, wherein the first logic is to access the critical instruction table to determine whether a second load instruction is a critical instruction and to identify the second load instruction as a critical instruction if an entry of the table is associated with the second load instruction.

7. The processor of claim 1, wherein the first logic is to set the miss indicator of the ROB entry when the data associated with the load instruction is not present in a first and a second cache of the first core.

8. The processor of claim 1, wherein the system agent is to prioritize a second transaction over at least one other pending transaction based on an identification of an originating core of the processor.

9. The processor of claim 8, wherein the system agent is to prioritize the second transaction corresponding to a latency-sensitive request from the first core over a third transaction corresponding to a bandwidth-sensitive request from a graphics engine of the processor.

10. A method comprising:
identifying, in a first core of a processor, a memory request corresponding to a load instruction as a critical transaction and storing an instruction pointer and metadata associated with the load instruction in a first table of the first core if a dependency counter field of an entry of a reorder buffer (ROB) associated with the load instruction is greater than a threshold and a miss indicator of the ROB entry is set, the miss indicator to indicate that the load instruction missed in a core cache;
thereafter identifying the load instruction as a critical instruction if the instruction pointer of the load instruction is present in the first table of the first core;
sending the memory request to a system agent of the processor with a critical indicator to identify the memory request as a critical transaction, responsive to the presence of the instruction pointer in the first table; and
prioritizing the memory request ahead of a plurality of pending transactions in the system agent responsive to the critical indicator.

11. The method of claim 10, further comprising prioritizing the memory request onto an interconnect of the system agent ahead of at least one other transaction seeking access to the interconnect.

12. The method of claim 11, further comprising prioritizing lookup for the memory request in a shared cache memory of the system agent ahead of at least one other transaction seeking access to the shared cache memory.

13. The method of claim 12, further comprising:
prioritizing a communication associated with the memory request from a memory controller of the system agent to a system memory coupled to the processor to obtain data for the memory request ahead of at least one other transaction seeking access to the system memory; and
prioritizing return of the data to the first core ahead of at least one other transaction seeking to communicate with the first core.

14. The method of claim 10, further comprising not storing the instruction pointer and the metadata in the first table if a ratio of a number of load instructions stored in the first table to a total number of unique load instructions is greater than a ratio threshold.

15. A system comprising:
a multicore processor including a first core to execute instructions, the first core including a pipeline, a first cache memory and a first logic to identify an instruction as a critical instruction based on a criticality level and a delinquency level associated with the instruction, including to identify the instruction as the critical instruction when a metadata field of a reorder buffer (ROB) entry associated with the instruction is greater than a first threshold and the instruction misses in at least one cache memory of the first core, the multicore processor further including and a system agent including a cache controller to control access to a shared cache memory and a memory controller to interface with a dynamic random access memory (DRAM) coupled to the multicore processor, wherein the cache controller and the memory controller are to prioritize fulfillment of a memory request having a critical indicator ahead of at least one other memory request not having the critical indicator; and
the DRAM coupled to the multicore processor.

16. The system of claim 15, wherein the system agent comprises a first arbiter associated with an interconnect of the system agent to prioritize the memory request having the critical indicator, a second arbiter associated with the cache controller to prioritize the memory request having the critical indicator and a third arbiter associated with the memory controller to prioritize the memory request having the critical indicator.

17. The system of claim 15, wherein the first logic is to store an instruction pointer of the instruction in a first table when the metadata field of the ROB entry is greater than the first threshold and the instruction misses in the at least one cache memory.

18. The processor of claim 1, wherein the interconnect comprises a plurality of stops each associated with a distributed cache controller portion, a distributed shared cache memory portion, and a core.

19. The processor of claim 18, wherein the interconnect comprises a ring interconnect.

20. The processor of claim 5, wherein the logic is to insert the instruction pointer of the load instruction in the table entry at retirement of the load instruction.

21. The processor of claim 5, wherein the processor is to determine a ratio of critical load instructions to unique load instructions based at least in part on metadata stored in the table.

* * * * *